(12) United States Patent
Suzuki

(10) Patent No.: US 6,453,716 B2
(45) Date of Patent: Sep. 24, 2002

(54) METHOD OF BLANKING ELEMENTS OF BELT FOR CONTINUOUSLY VARIABLE TRANSMISSION

(75) Inventor: Tetsuo Suzuki, Sayama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/798,898

(22) Filed: Mar. 6, 2001

(30) Foreign Application Priority Data

Mar. 6, 2000 (JP) ........................................ 2000-059802

(51) Int. Cl.[7] ........................... B21D 28/06; B21D 28/02
(52) U.S. Cl. ........................... 72/329; 72/331; 72/338
(58) Field of Search ........................... 72/329, 331, 339, 72/338, 334, 337

(56) References Cited

U.S. PATENT DOCUMENTS 4,320,647 A  3/1982  Kummeling et al. ......... 72/338

FOREIGN PATENT DOCUMENTS

| EP | 0278545 A | 8/1988 |
| EP | 1069341 A1 * | 1/2001 |
| JP | 63-115638 * | 5/1988 |

* cited by examiner

Primary Examiner—Daniel C. Crane
(74) Attorney, Agent, or Firm—Birch, Stewart, Kolasch & Birch, LLP

(57) ABSTRACT

Elements with heads confronting each other are blanked out of two opposite sides of an elongated metal sheet. The differences between thicknesses of the elements at a measurement point at or near necks of the elements and measurement points at ears of the elements are averaged, and a distance between corners of the metal sheet and a counter load of counter punches are established in order to keep the averages in an allowable range. When elements are blanked out of the metal sheet with the distance and the counter load thus established, even if the metal sheet is laterally displaced out of position, a belt assembly made up of the elements blanked out of the two opposite sides of the metal sheet and mixed at a ratio of about 1 to 1 poses no problems because variations in the thicknesses of the elements blanked out of one of the two opposite sides of the metal sheet and variations in the thicknesses of the elements blanked out of the other of the two opposite sides of the metal sheet cancel each other.

7 Claims, 4 Drawing Sheets

FIG. 1 (a)
FIG. 1 (b)
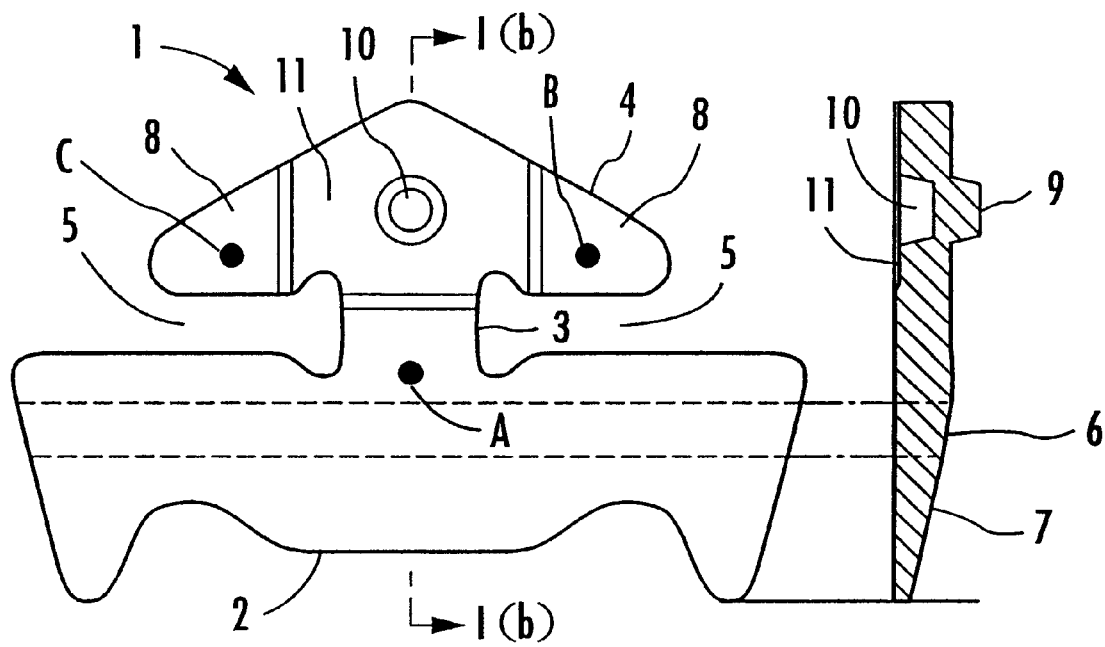
FIG. 2 (a)
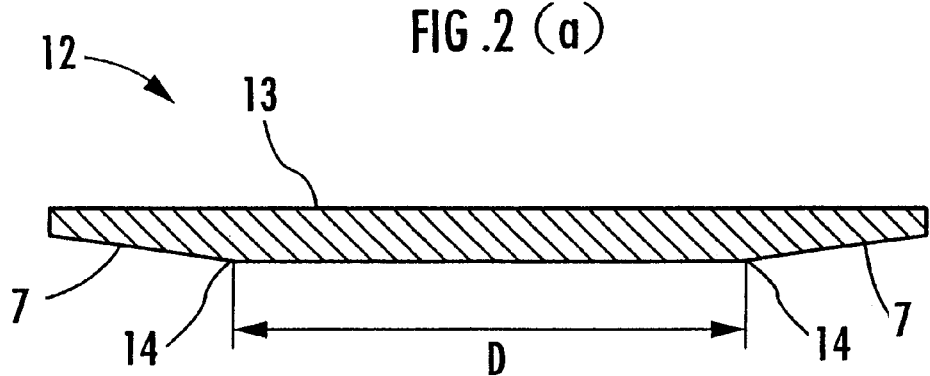
FIG. 2 (b)
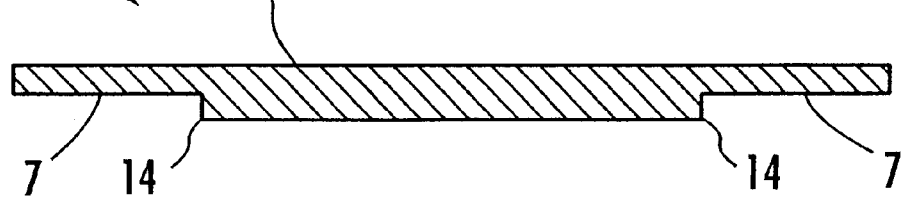

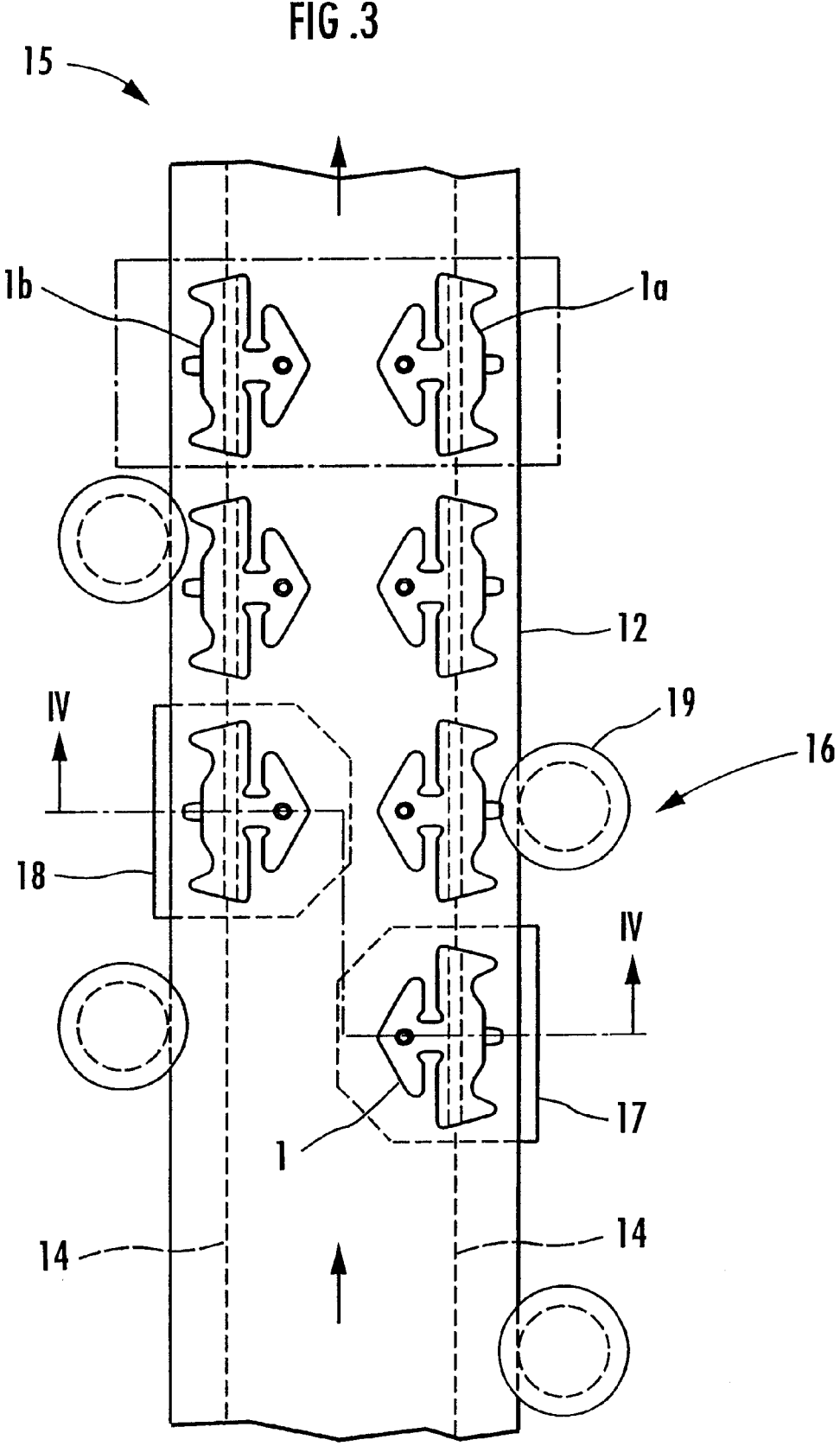

METHOD OF BLANKING ELEMENTS OF BELT FOR CONTINUOUSLY VARIABLE TRANSMISSION

BACKGROUND OF THE INVENTION

1. Field of the Invention

The present invention relates to a method of blanking elements of a belt for use in a continuously variable transmission.

2. Description of the Prior Art

As shown in FIGS. 1(a) and 1(b) of the accompanying drawings, an element 1 of a belt for use in a continuously variable transmission comprises a body 2 which, when a plurality of elements 1 are stacked and bundled into an annular form, will be positioned radially inside of the annular form, i.e., on a lower side in FIGS. 1(a) and 1(b), and a head 4 joined to the body 2 by a neck 3, to be positioned radially outside of the annular form. Between the head 4 and the body 2 that are positioned on the opposite sides of the neck 3, there are defined two recesses 5 in which endless rings, not shown, will be mounted to bundle the elements 1 into the annular form. The body 2 has on its lower reverse side a slanted surface 6 that is progressively tapered downwardly away from the head 4 and a thin portion 7 extending from the slanted surface 6 toward the lower end of the body 2.

The element 1 is usually formed by blanking, with a blanking punch, an elongate metal sheet placed on a die of an element manufacturing apparatus and having a thin portion joined to the rest of the metal sheet via a corner. The corner of the metal sheet is machined into the slanted portion 6 on the reverse side of the element 1 by a counter punch that is held against the reverse side of the element 1. A plurality of blanked elements, e.g., several hundred elements, are stacked and bundled into an annular form by endless rings mounted in the recesses in the elements, producing a belt assembly for use in a continuously variable transmission. Since the belt assembly is constructed of a number of stacked elements, it is important to manage the thicknesses of the elements. If the thicknesses of the body 2 and the head 4 are widely different from each other, for example, then the belt assembly is vertically distorted when the elements are stacked together. If the elements suffer large thickness variations in their transverse direction, then the belt assembly is laterally distorted when the elements are stacked together. The elements should be manufactured with increased productivity because a number of elements are needed to produce an element assembly.

When an element is blanked out of the metal sheet, the corner of the metal sheet is machined into the slanted surface. In order to keep the thickness of the element in an allowable range, it is necessary to position the metal sheet with increased accuracy at the time of blanking the element out of the metal sheet. However, productivity tends to be lowered if the metal sheet is positioned with increased accuracy.

Consequently, there has been a demand in the art for a process of blanking elements with increased productivity and a good yield.

SUMMARY OF THE INVENTION

It is therefore an object of the present invention to provide an improved method of blanking elements of a belt for use in a continuously variable transmission.

Another object of the present invention is to provide a method of blanking elements of a belt for use in a continuously variable transmission with increased productivity and a good yield.

When elements are blanked out of two opposite sides of an elongate metal sheet, the metal sheet may possibly be displaced transversely, and thickness variations of individual elements may possibly fall out of an allowable range. The inventor of the present invention has found that even if the metal sheet is displaced transversely and thickness variations of individual elements fall out of an allowable range, when the elements blanked from the opposite sides of the metal sheet are mixed at a ratio of about 1 to 1 into a belt assembly, the belt assembly thus constructed poses no problems for use in a continuously variable transmission.

According to the present invention, a method is provided for blanking elements of a belt for use in a continuously variable transmission, each having a body and a head joined to the body by a neck, the body having a slanted surface tapered away from the head and a thin portion extending from the slanted surface toward an end of the body remote from the head. In this method, an elongated metal sheet is prepared having a flat central portion extending longitudinally and a pair of thin portions disposed on a reverse side thereof and extending from respective corners at edges of the flat central portion toward opposite edges of the elongated metal sheet. Element blanking punches are applied to a face side of the elongated metal sheet, which is placed on a die to blank elements having heads confronting each other across the elongated metal sheet out of two opposite sides thereof, and counter punches are applied to the corners on the reverse side of the elongated metal sheet and movable with the element blanking punches to deform the corners of the elongated metal sheet under a counter load into slanted surfaces of the elements. Averages of the differences between thicknesses of blanked elements are determined at a measurement point positioned at or near the neck above the slanted surface and below the head and a measurement point positioned at the head. The distance between the corners of the elongated metal sheet and the counter load are established in order to keep the averages in a predetermined allowable range. Elements are then blanked out of the opposite sides of the elongated metal sheet with the established distance between the corners thereof, with the element blanking punches and the counter punches under the established counter load.

In the above method, the differences between thicknesses at certain points on individual elements are not managed, but the averages of the differences between thicknesses at certain points on elements blanked out of the opposite sides of the metal sheet are managed and brought into a given allowable range. Variations of the averages of the differences between thicknesses at certain points on elements blanked out of the opposite sides of the metal sheet with their heads confronting each other cancel each other. Therefore, even if the differences between thicknesses of individual elements do not fall out of an allowable range, a belt assembly constructed of these elements poses no problems for use in a continuously variable transmission. Thus, elements can be manufactured with a good yield. Since the metal sheet can be positioned with less accuracy when the elements are blanked out of the metal sheet than if the thicknesses of individual elements are managed, the elements can be manufactured with increased productivity.

The averages of the differences between thicknesses are adjusted based on the distance between the corners and the counter load. By averaging the differences between thicknesses at a measurement point positioned at the neck or nearly at the neck above the slanted surface and below the head and a measurement point positioned at the head, a belt assembly constructed of stacked elements is prevented from being distorted vertically.

In the method according to the present invention, each of the elements preferably has a pair of ears extending laterally from a center of the head, and the measurement point positioned at the head preferably comprises measurement points positioned respectively on the ears. Because the ears are positioned laterally of the head, when the average of the differences between thicknesses of the ears is brought into a given allowable range, a belt assembly constructed of stacked elements is prevented from being distorted horizontally.

In the method according to the present invention, the step of determining averages of the differences between thicknesses of blanked elements preferably comprises the step of determining the averages when the elements blanked from the two opposite sides of the elongated metal sheet are mixed at a ratio of about 1 to 1. Inasmuch as the elements are blanked from the two opposite sides of the elongated metal sheet, if the average of the differences between thicknesses of the elements blanked from one of the two opposite sides of the elongated metal sheet becomes larger, then the average of the differences between thicknesses of the elements blanked from the other of the two opposite sides of the elongated metal sheet becomes smaller. Therefore, if the elements blanked from the two opposite sides of the elongated metal sheet are mixed at a ratio of about 1 to 1, then variations of the averages of the differences between thicknesses of those elements cancel each other. With the heads thus constructed, therefore, thicknesses of the ears at certain locations thereof are measured.

In the method according to the present invention, the step of determining averages of the differences between thicknesses of blanked elements preferably comprises the step of determining the averages when the elements blanked from the two opposite sides of the elongate metal sheet are mixed at a ratio of about 1 to 1. Inasmuch as the elements are blanked from the two opposite sides of the elongate metal sheet, if the average of the differences between thicknesses of the elements blanked from one of the two opposite sides of the elongate metal sheet becomes larger, than the average of the differences between thicknesses of the elements blanked from the other of the two opposite sides of the elongate metal sheet becomes smaller. Therefore, if the elements blanked from the two opposite sides of the elongate metal sheet are mixed at a ratio of about 1 to 1, then variations of the averages of the differences between thicknesses of those elements cancel each other.

In the method according to the present invention, the step of establishing a distance between the corners and the counter load preferably comprises the steps of setting the distance between the corners to a value in order to keep the averages of the differences between thicknesses in an allowable range within an adjustable range of the counter load, and adjusting the counter load in order to reduce the averages of the differences between thicknesses when the elements are blanked.

To change the distance between the corners of the metal sheet, it is necessary to change the shape of the metal sheet. Therefore, if the metal sheet is produced by dies, then the dies need to be changed in shape. The counter load may be changed by changing forces with which the counter punches are biased. Therefore, the distance between the corners is established within the adjustable range of the counter load. Thereafter, elements are actually blanked out of the metal sheet, and the counter load is then adjusted in order to reduce the averages of the differences between thicknesses. In this manner, the averages of the differences between thicknesses can easily be reduced.

The thin portions of the elongated metal sheet may be slanted from the corners toward opposite edges of the elongated metal sheet, or may extend flatwise from the corners toward opposite edges of the elongated metal sheet.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 1(a) is a plan view of an element blanked out of a metal sheet by a blanking method according to the present invention;

FIG. 1(b) is a cross-sectional view taken along line I(b)—I(b) of FIG. 1(a);

FIG. 2(a) is a transverse cross-sectional view of a metal sheet out of which elements are to be blanked;

FIG. 2(b) is a transverse cross-sectional view of another metal sheet out of which elements are to be blanked;

FIG. 3 is a plan view of a blanking apparatus for carrying out the blanking method according to the present invention;

DETAILED DESCRIPTION OF THE PREFERRED EMBODIMENTS

Figure 4A:
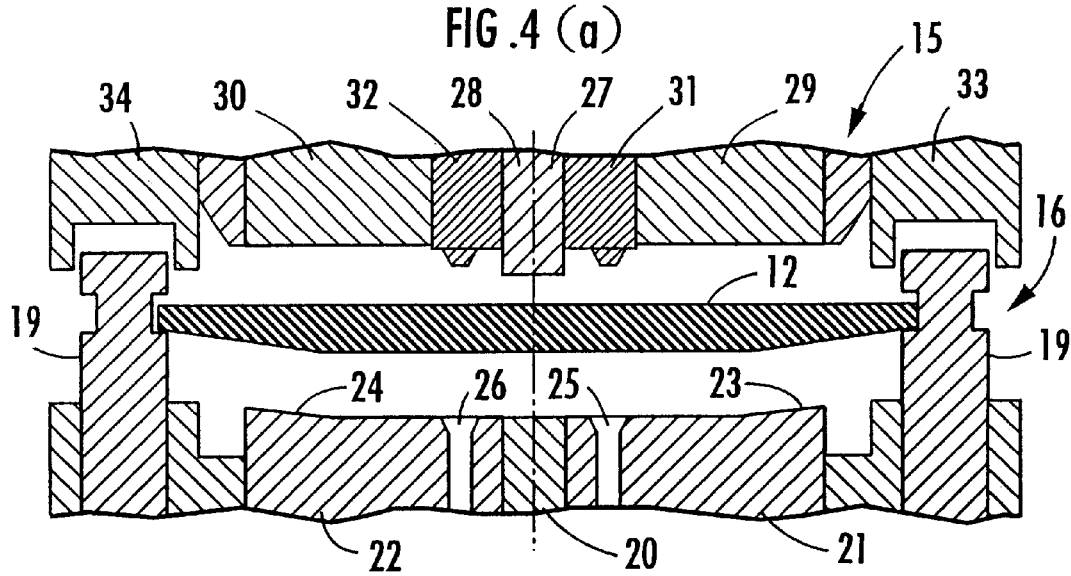
FIGS. 4(a), 4(b), and 4(c) are cross-sectional views taken along line IV—IV of FIG. 3, showing successive steps of the blanking method.

As shown in FIG. 1(a), an element 1 produced by a blanking method according to the present invention comprises a body 2 which, when a plurality of elements 1 are stacked and bundled into an annular form, will be positioned radially inside of the annular form, i.e., on a lower side in FIGS. 1(a) and 1(b), and a head 4 joined to the body 2 by a neck 3, to be positioned radially outside of the annular form. Between the head 4 and the body 2 that are positioned on the opposite sides of the neck 3, there are defined two recesses 5 in which endless rings, not shown, will be mounted to bundle the elements 1 into the annular form.

As shown in FIG. 1(b), the body 2 has on its lower reverse side a slanted surface 6 that is progressively tapered downwardly away from the head 4 and a thin portion 7 extending from the slanted surface 6 toward the lower end of the body 2. The head 4 has a pair of ears 8 extending laterally from a center thereof and disposed on respective lateral sides thereof. The head 4 also has a nose 9 and a hole 10 in a region thereof between the ears 8. When a plurality of elements 1 are stacked together, the nose 9 of the head 4 of one element 1 is fitted in the hole 10 of the head 4 of an adjacent element 1, so that the elements 1 are neatly aligned with each other. The head 4 also has a clearance 11 defined around the hole 10 for clearing a raised area around the nose 9 of an adjacent element 1 when the nose 9 is fitted in the hole 10. The ears 8 of the head 4, the neck 3, and an upper portion of the body 2 are in a planar configuration.

As shown in FIG. 3, two arrays of elements 1 are blacked out of a single elongate metal sheet 12 with the heads 4 of two laterally aligned elements 1 being disposed in confronting relation to each other. As shown in FIG. 2(a), the metal sheet 12 has a flat central portion 13 of a predetermined thickness extending longitudinally and a pair of longitudinal corners 14 on reverse side regions thereof. The metal sheet 12 also has a pair of thin portions 7 on respective opposite marginal edges thereof which are joined to the flat portion 13 via the respective corners 14. The corners 14 are spaced from each other by a distance D (see FIG. 2(a)) determined depending on the material of the metal sheet 12, the size and shape of the elements 1, or the thickness of the metal sheet 12. When elements 1 are blanked out of the metal sheet 12, the corners 14 are pressed into slanted surfaces 6 by slanted surface machining regions 23, 24 of counter punches 21, 22 shown in FIG. 4, which will be described later on. The thin portions 7 are slanted so as to be progressively tapered from the corners 14 toward the opposite edges of the metal sheet 12.

The blanking method according to the present invention is carried out by a blanking apparatus 15 shown in FIGS. 3 and 4(a)–4(c). As shown in FIG. 3, the blanking apparatus 15 has a feed path 16 for feeding the elongate metal sheet 12 therealong, and a first processing station 17 and a second processing station 18 that are spaced along the feed path 16. In the first processing station 17 and the second processing station 18, two elements 1 are simultaneously blanked out of the metal sheet 12. The blanking apparatus 15 also has a plurality of guide members 19 disposed on opposite sides of the feed path 16 for guiding the metal sheet 12 to move along the feed path 16 against lateral displacement.

Figure 4B:
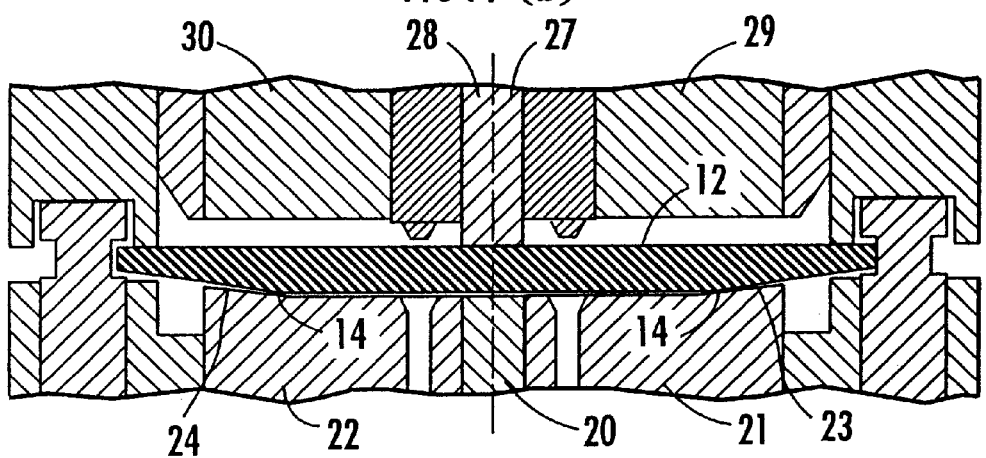
Figure 4C:
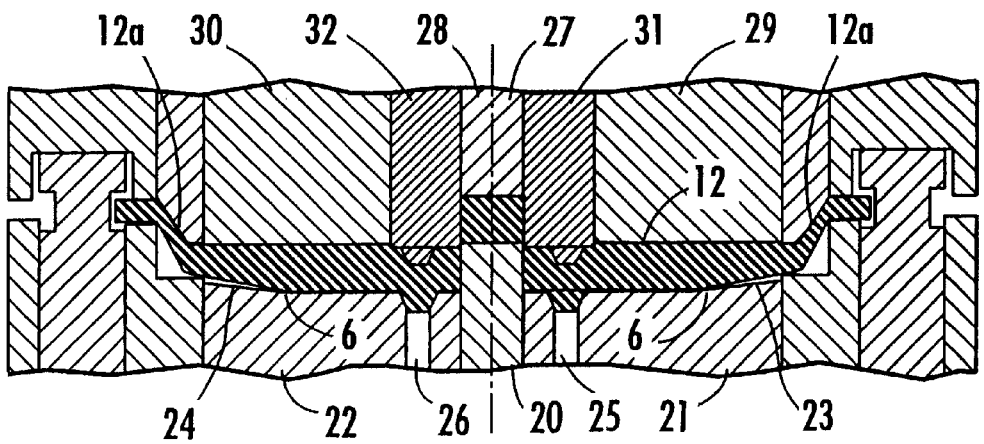

The first processing station 17 and the second processing station 18 have identical structural details. As shown in FIGS. 4(a) through 4(c), the first processing station 17 and the second processing station 18 have a die 20 and a pair of counter punches 21, 22 movable into and out of the die 20. The counter punches 21, 22 are normally biased to move upwardly out of the die 20 under a counter load imposed by biasing means, not shown. The counter load is established based on a distance D between the corners 14 of the metal sheet 12. The counter punches 21, 22 have respective slanted surface machining areas 23, 24 on their upper surfaces and inclined at the same angle as the slanted surfaces 6 of elements 1 for machining the slanted surfaces 6. The counter punches 21, 22 have respective nose forming holes 25, 26 defined therein for forming the noses 9 of elements 1.

The first processing station 17 and the second processing station 18 also have respective pads 27, 28 disposed above the feed path 16 and movable downwardly toward the die 20 for pressing the metal sheet 12 against the die 20, and a pair of element blanking punches 29, 30 vertically aligned with the respective counter punches 21, 22 for blanking elements 1 out of the metal sheet 12. The element blanking punches 29, 30 have respective hole forming punches 31, 32 for forming holes 11 and clearances 11, the hole forming punches 31, 32 being vertically movable in unison with the hole forming punches 31, 32. The first processing station 17 and the second processing station 18 are vertically movable in ganged relation to the element blanking punches 29, 30. The guide members 19 are biased to move upwardly by a biasing means, not shown, and can be lowered upon descent of the pads 27, 28 by guide member pressers 33, 34 on the pads 27, 28.

A blanking process carried out by the blanking apparatus 15 for blanking elements 1 out of the metal sheet 12 will be described below. it is assumed that the metal sheet 12 is slightly displaced to the right in FIGS. 4(a) through 4(c). As shown in FIG. 4(a), when the metal sheet 12 is fed along the feed path 16 while being prevented against lateral displacement by the guide members 19, the metal sheet 12 is pressed against the die 20 by the pads 27, 28, as shown in FIG. 4(b). At this time, the corners 14 on the reverse side of the metal sheet 12 abut against the respective slanted surface machining areas 23, 24 of the counter punches 21, 22.

When the element blanking punches 29, 30 are further displaced downwardly, as shown in FIG. 4(c), the element blanking punches 29, 30 blank respective elements 1 out of the metal sheet 1. Since the counter punches 21, 22 are biased upwardly under the counter load, the corners 14 of the metal sheet 12 are compressed into respective slanted surfaces 6 by the respective slanted surface machining areas 23, 24 of the counter punches 21, 22, as shown in FIG. 4(c). Because the metal sheet 12 is slightly displaced to the right, the corner 14 for the right element 1 is compressed to a greater extent than the corner 14 for the left element 1. At the same time, the hole forming punches 31, 32 and the nose forming holes 25, 26 form noses 9, holes 10, and clearances 11 on the elements 1.

When the blanking of the elements 1 out of the metal sheet 1 is finished, the element blanking punches 29, 30 are lifted, and then the pads 27, 28 are lifted. Since the counter punches 21, 22 are biased upwardly under the counter load, the blanked elements 1 are displaced upwardly together with the metal sheet 12 by the counter punches 21, 22. At this time, the blanked elements 1 remain joined to the metal sheet 12 by connectors 12a. The connectors 12a will be cut off at a subsequent stage to disconnect the elements 1 from the metal sheet 12.

Figure 5:
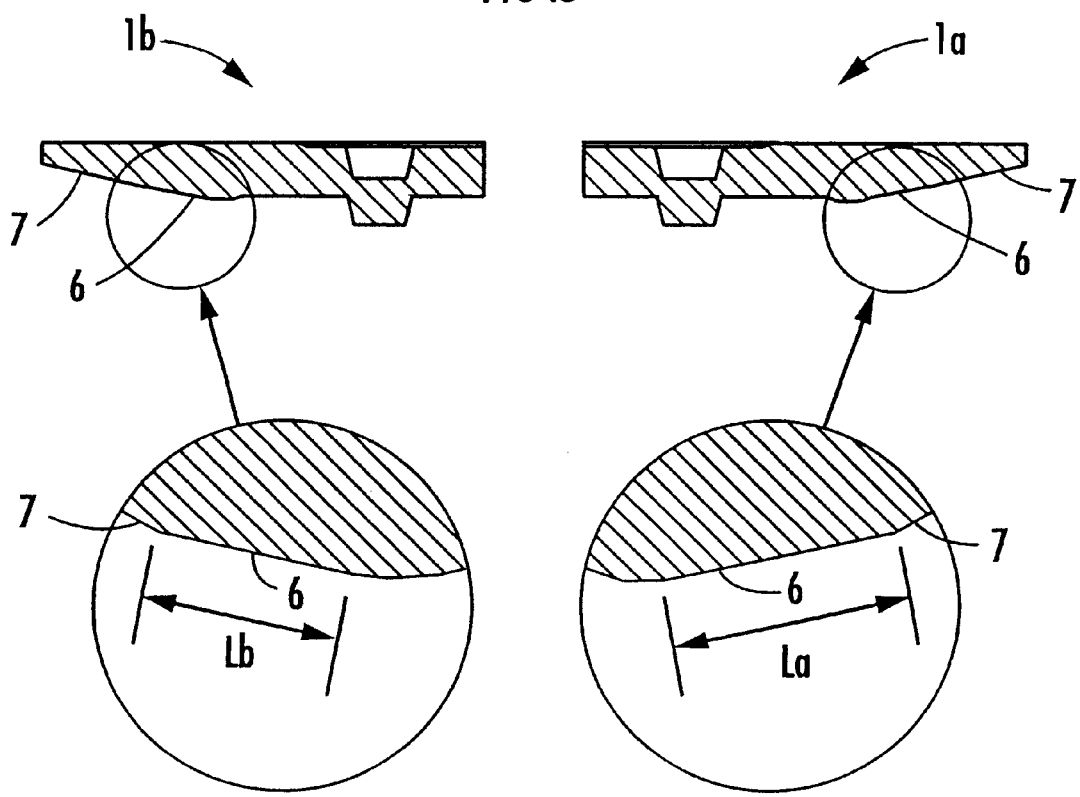
FIG. 5 is a cross-sectional view of a pair.of elements blanked out of a metal sheets with their heads confronting each other.

Because the metal sheet 12 is slightly displaced to the right, as shown in FIG. 5, the slanted surface 6 of the right element 1a is greater than the slanted surface 6 of the left element 1b, and has a length La, and the slanted surface 6 of the left element 1b is smaller than the slanted surface 6 of the right element 1a, and has a length Lb (La>Lb).

Figure 6:
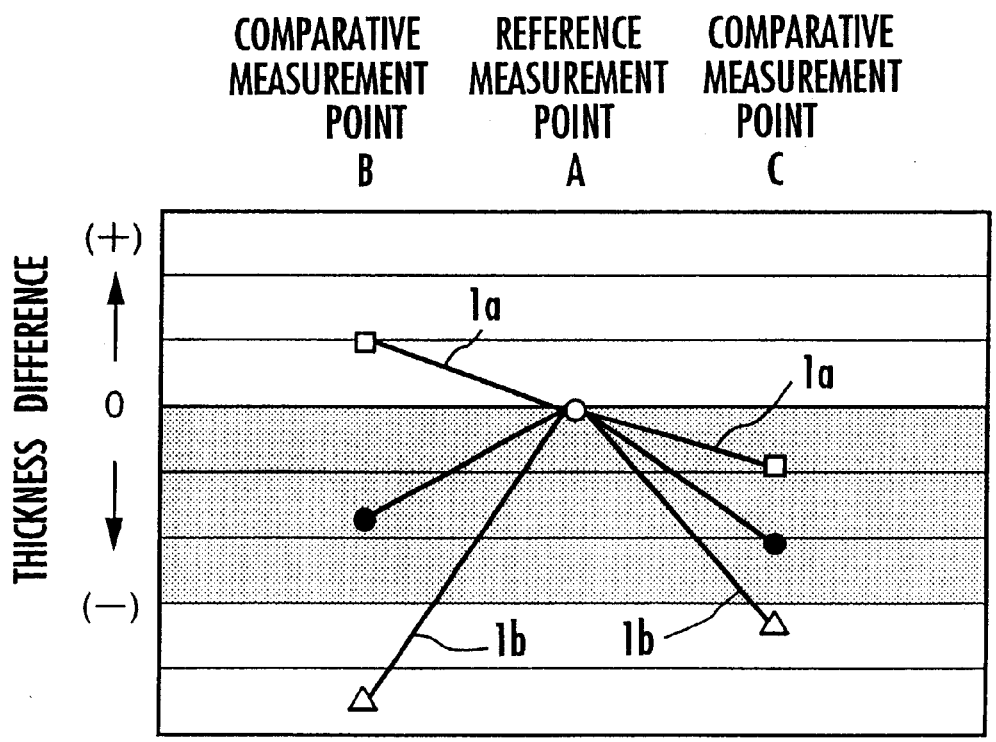
FIG. 6 is a graph showing the differences between. thicknesses at various measuring points of an element.

The thicknesses of the blanked elements 1 were measured at a reference measurement point A (see FIG. 1) positioned below the neck 3 and above the slanted surface 6, and comparative measurement points B, C positioned on the left and right ears 8, and the differences between the measured thicknesses, were calculated by subtracting the thicknesses at the comparative measurement points B, C from the thickness at the reference measurement point A. The results are shown in FIG. 6. In FIG. 6, square blank dots represent the thickness differences of the right element 1a in FIG. 5, and triangular blank dots represent the thickness differences of the left element 1b in FIG. 5. A shaded zone in the graph of FIG. 6 represents an allowable range of thickness differences.

On the blanked right element 1a, the slanted surface 6 is larger in size, raising the reference measurement point A to a large extent. While the thickness. difference between the reference measurement point A and the comparative measurement point B falls in the allowable range, the thickness difference between the reference measurement point A and the comparative measurement point C falls out of the allowable range. On the blanked left element 1b, the slanted surface 6 is smaller in size, raising the reference measurement point A to a small extent. The thickness differences between the reference measurement point A and the comparative measurement points B, C fall out of the allowable range. Accordingly, the elements 1a, 1b have heretofore been rejected as defective elements.

However, when the thickness differences between the reference measurement point A and the comparative measurement points B, C on the elements 1a, 1b that are blanked with their heads confronting each other are averaged, the average thickness differences at the comparative measurement points B, C fall in the allowable range. If the average thickness differences at the comparative measurement points B, C fall in the allowable range, then it has been confirmed that when the elements blanked from the left and right sides (see FIG. 3) of the metal sheet 12 are mixed at a ratio of about 1 to 1 into a belt assembly, the belt assembly thus constructed poses no problems for use in a continuously variable transmission. Therefore, even if individual elements 1 blanked out of the metal sheet 12 by the blanking process according to the present invention have thickness differences fall out of the allowable range, they can be stacked into a belt assembly that is acceptable for use in a continuously variable transmission. Therefore, according to the present invention, the number of any defective elements is reduced as compared with the conventional blanking process, and acceptable elements can be manufactured with an increased yield.

According to the present embodiment, the distance between the corners 14 of the metal sheet 12 is established and the counter load is adjusted, as follows: First, the distance between the corners 14 is established in order to keep the averages of the thickness differences at the measurement points in the allowable range within an adjustable range of the counter load. At this time, the average of the thickness differences at the measurement points should preferably be minimized at a middle point of the adjustable range of the counter load. Then, elements 1 are blanked by the blanking apparatus 15, and the averages of the thickness differences at the measurement points of the blanked elements 1 are determined. Thereafter, the counter load is finely adjusted to reduce the averages of the thickness differences at the measurement points. In this manner, even after the distance between the corners 14 of the metal sheet 12 has been established, the averages of the thickness differences at the measurement points can be reduced by finely adjusting the counter load.

In the illustrated embodiment, the averages of the thickness differences of the elements 1a, 1b that are blanked with their heads confronting each other are determined. However, since the difference between thicknesses of any elements blanked out of the left or right side (see FIG. 3) of the metal sheet 1 is small, the thickness differences of any elements blanked out of the left or right side of the metal sheet 1 may be averaged. In the above embodiment, the thin portion 7 is linearly tapered or slanted toward each of the opposite side edges of the metal sheet 12 in the cross-sectional shape thereof, as shown in FIGS. 1(b) and 2(a). However, as shown in FIG. 2(b), the thin portion 7 may be stepped from the corner 14 on each side of the metal sheet 12 and extend flatwise from the corner 14 toward each of the opposite side edges of the metal sheet 12 in the cross-sectional shape thereof.

Although certain preferred embodiments of the present invention have been shown and described in detail, it should be understood that various changes and modifications may be made therein without departing from the scope of the appended claims.

What is claimed is:

1. A method of blanking elements of a belt for use in a continuously variable transmission, each having a body and a head joined to the body by a neck, said body having a slanted surface tapered away from said head and a thin portion extending from said slanted surface toward an end of the body remote from said head, comprising the steps of:

preparing an elongated metal sheet, a face side thereof which is flat, and a reverse side thereof having a flat central portion extending longitudinally and a pair of thin portions extending laterally from respective corners at edges of said flat central portion toward opposite edges of said elongate metal sheet;

using element blanking punches to be applied to a face side of the elongated metal sheet which is placed on a die to blank elements having heads confronting each other across said elongated metal sheet out of two opposite sides thereof, and counter punches to be applied to the corners on the reverse side of the elongated metal sheet and movable with said element blanking punches to deform the corners of said elongate metal sheet under a counter load into slanted surfaces of the elements;

determining averages of the differences between thicknesses at a measurement point on said elongated metal sheet at or near where said neck of said element is to be formed by blanking, and at a measurement point on said elongated metal sheet where said head of said element is to be formed by blanking;

establishing a distance between the corners of said elongated metal sheet and said counter load in order to keep said averages in a predetermined allowable range; and blanking elements out of said opposite sides of the elongated metal sheet with the established distance between the corners thereof, with said element blanking punches and said counter punches under the established counter load.

2. The method according to claim 1, wherein each of said elements has a pair of ears extending laterally from a center of said head, and said measurement point positioned at said head comprises measurement points positioned respectively on said ears.

3. The method according to claim 2, wherein the head of each of said elements has a convex portion, a concave portion, and a clearance disposed around said concave portion, said convex portion is fitted in the concave portion of an adjacent element and said clearance clears a raised area around the convex portion in order to align said elements when said elements are stacked together, and wherein said ears are positioned laterally of said clearance.

4. The method according to claim 1, wherein said step of determining averages of the differences between thicknesses of blanked elements comprises the step of:

determining the averages when the elements blanked from the two opposite sides of said elongated metal sheet are mixed at a ratio of about 1 to 1.

5. The method according to claim 1, wherein said step of establishing a distance between the corners and said counter load comprises the steps of:

setting the distance between the corners to a value in order to keep the averages of the differences between thicknesses in an allowable range within an adjustable range of the counter load; and adjusting said counter load in order to reduce the averages of the differences between thicknesses when said elements are blanked.

6. The method according to claim 1, wherein said thin portions of said elongate metal sheet are slanted from said corners toward opposite edges of said elongated metal sheet.

7. The method according to claim 1, wherein said thin portions of said elongated metal sheet extend flatwise from said corners toward opposite edges of said elongate metal sheet.

* * * * *